(12) United States Patent
Lindén et al.

(10) Patent No.: US 7,730,798 B2
(45) Date of Patent: Jun. 8, 2010

(54) SENSOR MOUNTED IN THREADED ROD WITH MULTIPART SLEEVE FOR LINEAR ADJUSTMENT

(75) Inventors: Jan Lindén, Vaasa (FI); Magnus Pada, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 295 days.

(21) Appl. No.: 11/721,222

(22) PCT Filed: Nov. 15, 2005

(86) PCT No.: PCT/FI2005/050412

§ 371 (c)(1),
(2), (4) Date: Aug. 20, 2007

(87) PCT Pub. No.: WO2006/061455

PCT Pub. Date: Jun. 15, 2006

(65) Prior Publication Data

US 2009/0235741 A1 Sep. 24, 2009

(30) Foreign Application Priority Data

Dec. 9, 2004 (FI) .................................. 20041589

(51) Int. Cl.
*G01D 21/00* (2006.01)
(52) U.S. Cl. .................................................. 73/866.5
(58) Field of Classification Search ................ 73/866.5; 374/208
See application file for complete search history.

(56) References Cited

U.S. PATENT DOCUMENTS

| 2,910,544 | A | | 10/1959 | McNutt | |
|---|---|---|---|---|---|
| 4,327,586 | A | * | 5/1982 | Goddard | .................... 73/866.5 |
| 4,632,352 | A | * | 12/1986 | Stoll | ........................... 248/313 |
| 6,617,845 | B1 | | 9/2003 | Shafiyan-Rad et al. | |

FOREIGN PATENT DOCUMENTS

DE            4434711         4/1996

* cited by examiner

Primary Examiner—Hezron Williams
Assistant Examiner—Nathaniel Kolb
(74) *Attorney, Agent, or Firm*—Chernoff, Vilhauer, McClung & Stenzel, LLP

(57) ABSTRACT

A measurement sensor includes an elongated sensor part at the first end of which is the electrical connection of the sensor part and at the second end of which is the sensor end of the sensor part. A first sleeve part is arranged around the sensor part for attaching the measurement sensor to the object to be measured and for supporting the sensor part. A second sleeve part extends into the first sleeve part, the second sleeve part being rotatably arranged in connection with the first sleeve part. The sensor part has an external thread and the second sleeve part has an internal thread, the external thread of the sensor part and the internal thread of the second sleeve part are connected to each other so that when the second sleeve part is rotated in relation to the sensor part, the sensor part moves in the direction of its longitudinal axis in relation to the first and second sleeve parts.

13 Claims, 2 Drawing Sheets

SENSOR MOUNTED IN THREADED ROD WITH MULTIPART SLEEVE FOR LINEAR ADJUSTMENT

Figure 1:
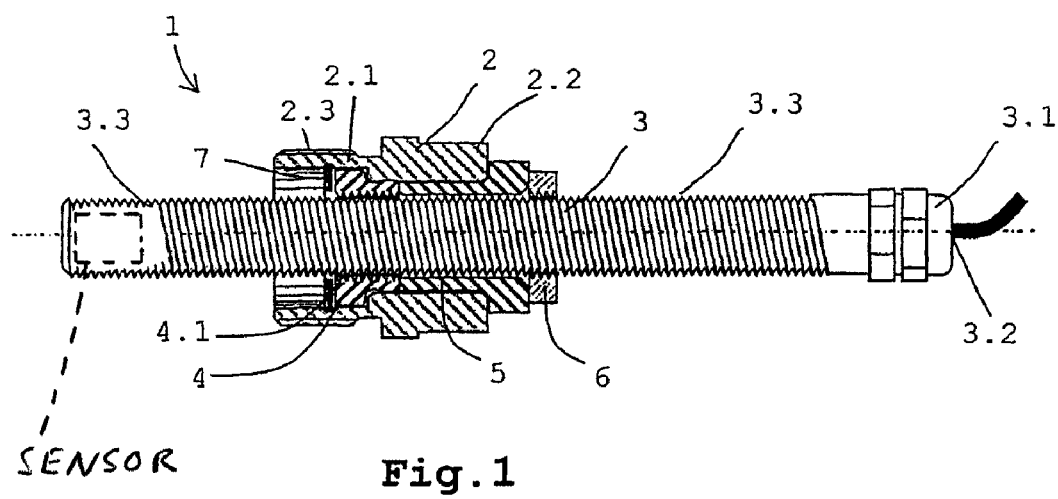

The present invention relates to a measurement sensor as described in the preamble of claim 1, the sensor comprising an elongated sensor part, at the first end of which the electrical connection of the sensor part is located and at the second end of which the sensor end of the sensor part is located, the measurement sensor comprising a first sleeve part arranged around the sensor part for attaching the measurement sensor to the object having the measurement target and for supporting the sensor part.

Especially, accomplishing monitoring and control of operation in a modern reciprocating engine demands a number of measurement sensors arranged in the engine. Often, the distance between the attachment point and the measurement point varies as the application locations of the measurement sensor are changed. It would naturally be preferable to be able to construct the sensors externally as similar as possible regardless of the object of measurement. However, in the various measurement places of an engine there often are differences in distance between the mounting point of the sensor and the measurement point and additionally, the distance of the sensor itself from the point to be measured can be different. Further, during operation there might be a need to adjust this distance.

The object of the invention is to produce a measurement sensor, by means of which the distance between the mounting point of the sensor and the measurement point can be adjusted and set easily and accurately and that also maintains the set distance in a demanding environment.

The objects of the invention are mainly achieved as disclosed in the appended claim 1 and as more closely explained in other claims.

The measurement sensor according to the invention comprises an elongated sensor part, at the first end of which the electrical connection of the sensor part is located and at the second end of which the sensor end of the sensor part is located. The measurement sensor comprises a first sleeve part arranged around a sensor part for attaching a measurement sensor to the object to be measured and for supporting the sensor part. A characterising feature of the invention is that the measurement sensor comprises a second sleeve part rotatably arranged inside the first sleeve part and that the sensor part comprises an outer screw thread and the second sleeve part comprises an internal screw thread, the outer thread of the sensor part and the inner thread of the second sleeve part being attached to each other so that when the second sleeve part is rotated in relation to the sensor part, the sensor part moves in the direction of its longitudinal axis in relation to the first and second sleeve parts. Thus, the position of the sensor part can be adjusted without turning the sensor part itself.

In more detail, the measurement sensor according to one preferable embodiment comprises the second sleeve part to extend to a first direction inside a first sleeve part, the second sleeve part being rotatably arranged in connection with the first sleeve part, the measurement sensor comprising a third sleeve part to extend in another direction inside the first sleeve part, the third sleeve part being rotatably arranged inside the first sleeve part. The second and third sleeve parts are positioned in the measurement sensor in power transmission connection with each other so that the second sleeve part rotates as the third sleeve part is rotated and that the sensor part comprises an external thread and the second sleeve part comprises an internal thread, the external thread of the sensor part and the internal thread of the second sleeve part are in mesh with each other.

The measurement sensor additionally comprises a locking nut arranged on the external thread of the sensor part on the side of the first end of the sensor part of the first sleeve part. The second sleeve part is wholly arranged inside the first sleeve part and it is locked by means of a locking nut acting axially as a locking part.

Either one of the second or third sleeve parts comprises at least one recess and the other an extension fitting into the recess, respectively, by means of which the power transmission connection of these is carried out. The length of the recess in the axial direction of the measurement sensor is longer than the axial length of the extension corresponding with it, whereby during installation the tightening of the locking screw pushes the second and third sleeve parts into the first sleeve part and thereby locks the parts of the measurement sensor into each other.

Figure 2:
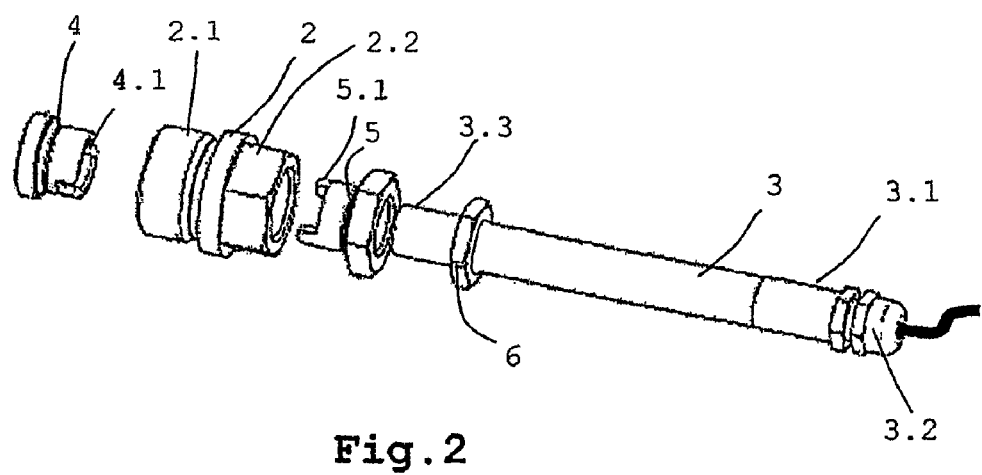
Figure 3:
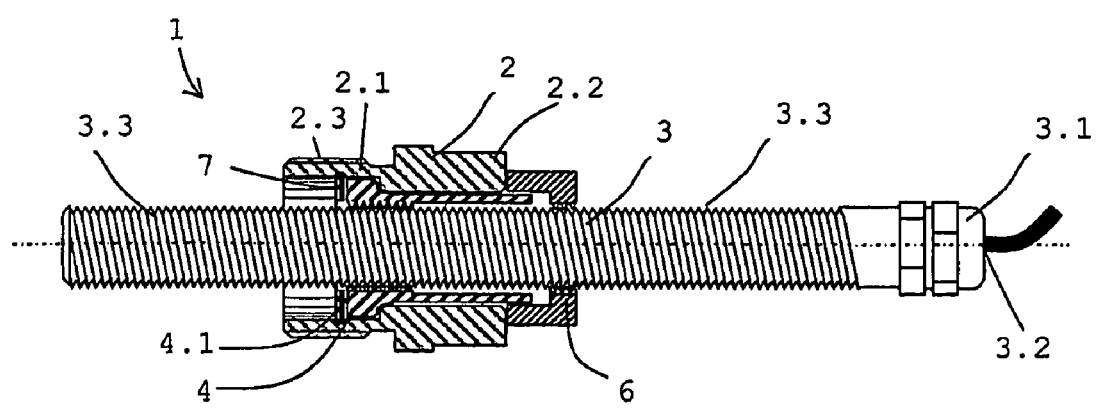

In the following the invention is described by way of example and with reference to the appended drawings, of which FIG. 1 shows an embodiment according to the invention in cross-section, FIG. 2 illustrates the embodiment of FIG. 1 with the parts disassembled from each other, and FIG. 3 illustrates another embodiment according to the invention.

FIGS. 1 and 2 show an embodiment of the measurement sensor 1 according the invention. It consists of a sensor part 3, the part being a mainly cylindrical piece having an elongated shape. The first end 3.1 of the sensor part contains its electrical connection 3.2, to which the cabling attached thereto is connected. The sensor of the sensor part is accordingly located in the other end, the sensor end 3.3. The sensor part can also be provided with various types of sensors depending on each application. The measurement sensor comprises a first sleeve part 2, by which the measurement part 3 of the measurement sensor 1 is supported and through which the measurement sensor is further attached to the object to be measured. The first sleeve part 2 comprises a first end 2.1 and a second end 2.2. The first end 2.1 is provided with an external thread 2.3 for attaching the first sleeve part to the object to be measured, whereas the second end 2.2 is formed as a hexagonal nut for ease of attaching.

Inside the first sleeve part 2 is arranged a second sleeve part 4 freely rotatable around its longitudinal axis. The second sleeve part is wholly arranged inside the first sleeve part and is locked by means of a locking nut 7 acting axially as a locking part. The second sleeve part comprises a collar preventing the second sleeve part to fully move through the first sleeve part 2. The collar is located on the side of the first end 2.1 of the first sleeve part. The second sleeve part 4 is provided with an internal thread 4.1, the purpose of which is described in the following. Namely, the sensor part 3 of the measurement sensor 1 is provided with an external thread 3.3, corresponding to the internal thread 4.1 of the second sleeve part. By means of this, the sensor part 3 is threaded into the thread 4.1 of the second sleeve part 4, whereby the sensor part is supported by the first sleeve part via the second sleeve part. According to the basic idea of the invention, when the sensor part is prevented from rotating and the second sleeve part 4 is rotated, the sensor part moves in the direction of the longitudinal axis in relation to the first and second sleeve parts. Thus, the position of the sensor part of the measurement sensor in relation to the object to be measured and also to the attachment point of the measurement sensor can be adjusted simply by rotating the second sleeve part. This solution keeps the sensor part 3 from rotating, whereby there will be no turning of the cabling, either. This will also avoid having to remove the cabling, which would be necessary if the cabling rotated when installing or adjusting the sensor.

In order to rotate the second sleeve part 4, in the embodiments of the figures a third sleeve part 5 has been further rotatably arranged inside the first sleeve part. The third sleeve part also comprises a collar preventing the third sleeve part to wholly move through the first sleeve part 2. The collar is located on the side of the second end 2.1 of the first sleeve part. The second and third sleeve parts are in connection with each other so the rotating the third sleeve part also causes the rotation of the second sleeve part. Thus, when the measurement sensor is installed, for example, an opening made in a wall, the measurement sensor can be moved without the need for access to the measurement sensor on the other side of the wall.

FIG. 2 illustrates, how, among others, the second sleeve part 4 is provided with two recesses 4.1 on the circumference forming its second end. The third sleeve part is correspondingly provided with extensions 5.1 that can be located in the recesses 4.1. When the second and third sleeve parts are installed inside the first sleeve part, the extensions 5.1 set into the recesses 4.1, whereby the power needed for rotating the second sleeve part 4 is transmitted through the pairs of extensions and recesses from the third sleeve part 5. Such a power transmission connection can be accomplished using a similar principle with solutions having different details. It is important that it be possible to rotate the second sleeve part 4 from the side of the second end 2.2 of the first sleeve part.

A locking nut 6 has been arranged on the thread of the sensor part 3, by means of which the assembly can be locked to place subsequent to adjustment. When the locking nut 6 is tightened, the first sleeve part 5 is pushed between the collar 4 of the second sleeve part and the collar of the third sleeve part, whereby the assembly is locked in its place.

FIG. 3 illustrates an embodiment in which the second sleeve part 4 extends out from the second end 2.2 of the first sleeve part 2, whereby it can be rotated directly without a separate intermediate piece as shown in the embodiment of FIG. 1. In the embodiment of FIG. 3 the locking nut 6 is also slightly different in shape from that in FIG. 1. This is because the tightening force of the locking nut is here directed directly against the first sleeve part 2.

The invention is not limited to the embodiments described here, but a number of modifications thereof can be conceived of within the scope of the appended claims.

The invention claimed is:

1. A measurement sensor comprising a longitudinal sensor part at a first end of which is an electrical connection for the sensor part and at a second end of which is a sensor end, the measurement sensor comprising a first sleeve part arranged around the sensor part for attaching the measurement sensor to an object to be measured and for supporting the sensor part, and wherein the measurement sensor comprises a second sleeve part rotatably arranged inside the first sleeve part and the sensor part comprises an external thread and the second sleeve part comprises an internal thread, the external thread of the sensor part and the internal thread of the second sleeve part are attached to each other so that when the second sleeve part is rotated in relation to the sensor part and the first sleeve part, the sensor part moves in the direction of its longitudinal axis in relation to the first and second sleeve parts, wherein the second sleeve part extends in a first direction into the first sleeve part, the second sleeve part being freely rotatably arranged in connection with the first sleeve part and held against axial movement relative to the first sleeve part, and the measurement sensor further comprises a locking nut arranged on the external thread of the sensor part between the first sleeve part and the first end of the sensor part.

2. A measurement sensor according to claim 1, wherein the measurement sensor comprises a third sleeve part to extend in a second direction inside the first sleeve part, the third sleeve part being rotatably arranged in connection with the first sleeve part, the second and third sleeve parts are in power transmission connection with each other inside the measurement sensor so that the second sleeve part rotates as the third sleeve part is rotated, the sensor part comprises an external thread and the second sleeve part comprises an internal thread, and the external thread of the sensor part and the internal thread of the second sleeve part are in connection with each other.

3. A measurement sensor according to claim 2, wherein the second sleeve part is wholly arranged inside the first sleeve part and is axially locked by means of the locking nut.

4. A measurement sensor according to claim 2, wherein either one of the second and third sleeve parts comprises at least one recess and one, correspondingly, comprises an extension that fits inside the recess, by means which recess and extension the power transmission connection is accomplished.

5. A measurement sensor according to claim 2, wherein the length of the recess in the axial direction of the measurement sensor is larger than the axial length of the extension corresponding to it, whereby during assembly the tightening of the locking nut presses the second and the third sleeve parts into the first sleeve part and thereby locks the parts of the measurement sensor to each other.

6. A measurement sensor assembly for attachment to an object and comprising: an elongate sensor part having a first end at which there is an electrical connection and also having an opposite second end and an external thread, a sleeve structure arranged around the sensor part for attaching the measurement sensor assembly to the object and adjustably supporting the elongate sensor part relative to the object, the sleeve structure comprising a first sleeve part for attaching the measurement sensor assembly to the object and a second sleeve part extending into the first sleeve part and having an internal thread in threaded engagement with the external thread of the elongate sensor part, the second sleeve part being freely rotatable relative to the first sleeve part and held against axial movement relative to the first sleeve part so that when the second sleeve part is rotated relative to the first sleeve part and the sensor part, the sensor part moves longitudinally relative to the first and second sleeve parts, and a locking nut in threaded engagement with the external thread of the elongate sensor part between the first sleeve part and the first end of the elongate sensor part.

7. A measurement sensor assembly according to claim 6, comprising a sensor located at the second end of the elongate sensor part.

8. A measurement sensor assembly according to claim 6, wherein the second sleeve part extends into the first sleeve part from the end of the first sleeve part that is nearer the second end of the elongate sensor part and the assembly further comprises a third sleeve part that extends into the first sleeve part from the end of the first sleeve part that is nearer the first end of the elongate sensor part, the third sleeve part being freely rotatable relative to the first sleeve part and being in force transmission connection with the second sleeve part, whereby rotation of the third sleeve part effects rotation of the second sleeve part.

9. A measurement sensor assembly according to claim 8, wherein the locking nut engages the third sleeve part.

10. A measurement sensor assembly according to claim 8, wherein one of the second sleeve part and the third sleeve part is formed with a recess and the other of the second sleeve part and the third sleeve part is formed with an extension that is engageable with the recess for providing force transmission connection from the third sleeve part to the second sleeve part.

11. A measurement sensor assembly according to claim 10, wherein the axial length of the recess is greater than the axial length of the extension, whereby tightening of the locking nut presses the second sleeve part and the third sleeve part into the first sleeve part and thereby locks the parts of the assembly to each other.

12. A measurement sensor assembly according to claim 8, wherein the second sleeve part and the third sleeve part have complementary formations for providing the force transmission connection.

13. A measurement sensor assembly according to, claim 8, wherein the second sleeve part is disposed wholly within the first sleeve part.

* * * * *